ary Office 3,845,193
Patented Oct. 29, 1974

3,845,193
PRODUCTION OF URANIUM DIOXIDE IN A
ROTARY KILN
James Edgar Littlechild, Lytham St. Annes, and George
Marshall Gillies, St. Annes, England, assignors to
United Kingdom Atomic Energy Authority, London,
England
No Drawing. Continuation of abandoned application Ser.
No. 78,206, Oct. 2, 1970. This application Mar. 13,
1973, Ser. No. 340,875
Claims priority, application Great Britain, Oct. 15, 1969,
50,791/69
Int. Cl. C01g 43/02
U.S. Cl. 423—261
3 Claims

ABSTRACT OF THE DISCLOSURE

Uranium hexafluoride is reacted with dry steam in one region of a process vessel and the uranyl fluoride produced is deposited directly in a second region of the process vessel for reaction at a higher temperature with steam hydrogen or a steam/hydrogen mixture to produce a required uranium oxide. In a particular process the uranium hexafluoride and dry steam are passed together through a jet into an inlet chamber at the upper end of the barrel of a rotary kiln. The gases issuing from the jet react to form a plume of uranyl fluoride powder which is deposited directly in the upper end of the kiln barrel. The uranyl fluoride powder passes down the kiln barrel in counter current flow to a steam hydrogen mixture which converts the uranyl fluoride to uranium dioxide.

This is a continuation of application Ser. No. 78,206 filed Oct. 2, 1970, now abandoned.

BACKGROUND OF THE INVENTION

This invention relates to the processing of uranium and in particular to a "dry" process for the conversion of uranium hexafluoride to the oxides of uranium, particularly uranium dioxide.

The reaction of uranium hexafluoride with dry steam to produce uranyl fluoride ($UO_2F_2$) is well known. It is also well known that the uranyl fluoride product can be reacted further at higher temperatures with either steam or hydrogen or preferably with a steam/hydrogen mixture to produce a uranium oxide of low fluoride content.

Hitherto the uranyl fluoride has been produced by reaction of gaseous uranium hexafluoride with dry steam in one process vessel, the uranyl fluoride so produced then being transported to a further process vessel for subsequent conversion to the required uranium oxide by treatment with steam and/or hydrogen.

Although the uranyl fluoride as produced by the first reaction is of a light reactive nature it is not free flowing and is easily agglomerable. Hence the uranyl fluoride is not easily transportable between process vessels. Also uranyl fluoride being of a highly toxic nature is hazardous to transport between process vessels. Because the powder is so easily agglomerated blockages of equipment can occur during transportation of the uranyl fluoride necessitating break down of the equipment with release of uranyl fluoride in the working area.

SUMMARY OF THE INVENTION

According to the present invention uranium hexafluoride is reacted with dry steam to produce uranyl fluoride powder in a first region of a process vessel, the uranyl fluoride powder so produced being directly deposited in a second region of the same process vessel, in which region the uranyl fluoride is reacted at a higher temperature with steam or hydrogen or a steam/hydrogen mixture to convert the uranyl fluoride to a required uranium oxide.

Uranium hexafluoride and dry steam may be injected together into the first region of the process vessel to form uranyl fluoride. Alternatively uranium hexafluoride may be injected alone into the first region of the process vessel to react with excess steam passing from the second region of the process vessel, that is from the reaction converting the uranyl fluoride to uranium oxide. The uranyl fluoride as produced by the reaction of gaseous uranium hexafluoride and dry steam and which is deposited directly as formed in the second region of the process vessel, where it is to be converted to the required uranium oxide, is of a finely divided nature so as to be in a reactive condition to the reactants (e.g. steam, hydrogen or steam/hydrogen mixtures) in the second region of the process vessel. Direct deposition of the uranyl fluoride for conversion to uranium oxide in this manner means that the uranyl fluoride does not undergo an unpredictable change in character such as can occur when uranyl fluoride is transported between separate process vessels and which can affect reproducibility of the nature of the uranium oxide achieved.

Also as the uranyl fluoride is produced and converted to uranium oxide in the same process vessel this avoids the difficulties of transportation and toxic hazards which arise in conveying uranyl fluoride between separate process vessels.

DESCRIPTION OF THE PREFERRED EMBODIMENTS

In a preferred way of carrying out a process in accordance with the invention an inclined rotating barrel type kiln is employed. An inlet chamber is provided connecting with the upper end of the kiln barrel. Uranium hexafluoride vapour and dry steam are injected together into the inlet chamber through a jet comprising concentric inner and outer tubes with the uranium hexafluoride passing through the inner tube and the dry steam passing through the annulus between the inner and outer tubes of the jet. At the outlet of the jet the uranium hexafluoride and the dry steam react together to form a plume of uranyl fluoride powder and the jet is arranged so that the plume of uranyl fluoride powder is directed towards the upper end of the kiln barrel.

The majority of the uranyl fluoride formed in the plume is carried forward into the upper end of the kiln barrel by the velocity of ejection from the jet. The uranyl fluoride powder deposited in the upper end of the kiln barrel is moved slowly and steadily down the rotating barrel of the kiln by means of the angle of inclination of the kiln barrel which is tilted from the inlet chamber end down to the other end from which the uranium oxide product is discharged into an outlet chamber. The uranyl fluoride powder in passing down the barrel of the kiln is contacted with a countercurrent flow of steam, hydrogen or a steam/hydrogen mixture, which gases are fed into the lower end of the kiln barrel through the uranium oxide product outlet chamber. The temperature in the kiln barrel is maintained at the level required to convert the uranyl fluoride powder to the required uranium oxide by external banks of heating elements surrounding the kiln barrel. The heating elements are independently and separately controlled so as to establish a predetermined temperature profile along the barrel of the kiln.

Lifting flights may be provided in the barrel of the kiln which tumble the uranyl fluoride powder and cause it to move in a downwards spiral path in countercurrent flow to the reactant gases with a lifting and tumbling motion of the powder which ensures efficient gas/solids contacting and rapid and efficient conversion of the uranyl fluoride powder to uranium oxide powder. The tumbling of the uranyl fluoride powder in passing down the barrel of the kiln achieves the necessary agglomeration and densification of the powder so that the finally produced fluoride free uranium oxide powder is free flowing and thereby capable of being easily handled in conventional powder handling equipment.

Although the majority of the uranyl fluoride produced at the reaction jet is ejected directly into the powder inlet end of the kiln a proportion of the uranyl fluoride powder will fall to the bottom of the inlet chamber. Also the waste gases emerging from the powder inlet end of the kiln will carry back an amount of the uranyl fluoride powder. The uranyl fluoride powder is removed from the waste gases by filters in the inlet chamber. The filters have blow back facilities for removal of accumulated uranyl fluoride powder which when dislodged from the filters falls to the bottom of the inlet chamber. A rotating scroll feeder may be provided in the inlet chamber to collect the uranyl fluoride powder which gathers on the floor of the inlet chamber and propels the powder into the inlet end of the kiln.

In an alternative method uranium hexafluoride alone is injected into the end of the kiln to react in the form of a plume with excess steam leaving the end of the kiln from the second reaction in which the uranyl fluoride is converted to uranium oxide in the kiln.

The reaction between the uranium hexafluoride and the dry steam in the inlet chamber is typically carried out at a plume temperature in the range 200–500° C. The reaction temperature is determined by the amount of preheating of the uranium hexafluoride, by the temperature at which the drysteam is injected, by the fact that the reaction between uranium hexafluoride and dry steam is exothermic and by heat supplied from the waste gases entering the inlet chamber from the upper end of the kiln barrel. The reaction of the uranyl fluoride powder in the kiln barrel with steam, hydrogen or a steam/hydrogen mixture is typically carried out at a temperature in the range 500–800° C. The temperature profile in the kiln body is controlled so that the highest temperature exists at the middle of the kiln barrel with lower temperatures existing at the inlet and outlet ends of the kiln barrel. For example the temperature at the middle of the kiln barrel is typically in the range 630–770° C. with a temperature in the range 530–720° C. towards the upper uranyl fluoride inlet end of the kiln barrel and a temperature in the range 580–770° C. towards the lower product outlet end of the kiln barrel.

In a particular process for the production of uranium dioxide powder dry steam at 150° C. and uranium hexafluoride at 100° C. are injected into the inlet chamber through the jet to produce the plume of uranyl fluoride powder. The uranyl fluoride powder deposited in the kiln barrel is then reacted, in passing down the kiln barrel with a steam/hydrogen mixture passing up the kiln barrel in countercurrent flow to the uranyl fluoride powder. Steam is injected into the lower end of the kiln barrel at 150° C. through a pipe extending through the product outlet chamber into the lower end of the kiln barrel whilst hydrogen is introduced at atmospheric temperature through an inlet in the product outlet chamber. The temperature in the region about the centre of the kiln barrel is maintained at 720° C. by the external heating elements whilst the temperature in the region of the kiln barrel on either side of the centre region is maintained at 630° C. The temperature at the upper end of the kiln body, which is the temperature of the waste gases (steam and hydrogen) passing from the upper end of the kiln barrel into the inlet chamber is 400° C. This process results in the production of a uranium dioxide powder which can be pressed and sintered to form uranium dioxide bodies of high density typically of a density of 10.65 grams per cubic centimetre (the maximum theoretical density of uranium dioxide being 10.94 grams per cubic centimetre). Raising of the temperature in the centre region of the kiln barrel say to 770° C. and loweing of the temperature in the region of the kiln body towards the upper inlet end to 530° C. results in the production of a uranium dioxide which sinters to a lower density for example 10.3 grams per cubic centimetre.

We claim:

1. A process for the conversion of uranium hexafluoride to uranium dioxide which comprises injecting uranium hexafluoride vapor into an upper end of a process vessel comprising an inclined rotary barrel type kiln, reacting said uranium hexafluoride vapor in said upper end with dry steam to form a plume of uranyl fluoride powder, said plume being directed towards the upper end of the barrel of the kiln so that the majority of the uranyl fluoride produced is deposited directly in the upper end of the barrel of the kiln and converting uranyl fluoride powder to uranium oxide powder by reacting the uranyl fluoride passing down the barrel of the kiln with a reactant selected from the group consisting of steam, hydrogen and a steam/hydrogen mixture, said reactant passing in countercurrent flow to the uranyl fluoride, at a temperature higher than the temperature in said upper end and sufficient to convert said uranyl fluoride powder to uranium dioxide.

2. A process as claimed in claim 1 wherein the rotating barrel type kiln employed has an inlet chamber at its upper end and the uranium hexafluoride vapour and dry steam are fed together into the inlet chamber through a jet comprising inner and outer concentric tubes directed towards the upper end of the barrel of the kiln the uranium hexafluoride vapour and the dry steam reacting together at the outlet of the jet to form a plume of uranyl fluoride powder directed towards the upper end of the barrel of the kiln.

3. A process as claimed in claim 2 wherein means are provided for moving any uranyl fluoride powder deposited in the inlet chamber from the inlet chamber into the upper end of the barrel of the kiln.

References Cited

UNITED STATES PATENTS

| 3,235,327 | 2/1966 | Blundell et al. | 423—261 |
| 3,260,575 | 6/1966 | Heestand et al. | 423—261 |
| 3,111,394 | 11/1963 | Weber et al. | 23—279 |

BENJAMIN R. PADGETT, Primary Examiner

R. L. TATE, Assistant Examiner

U.S. Cl. X.R.

423—258